United States Patent [19]

Beck et al.

[11] 4,079,174

[45] Mar. 14, 1978

[54] ACCUMULATOR EQUIPPED WITH CATHODES OF MANGANESE DIOXIDE OR LEAD DIOXIDE

[75] Inventors: Fritz Beck, Ludwigshafen; Gerd Wunsch, Speyer; Wolfram Treptow, Ludwigshafen, all of Germany

[73] Assignee: BASF Aktiengesellschaft, Ludwigshafen, Germany

[21] Appl. No.: 797,320

[22] Filed: May 16, 1977

Related U.S. Application Data

[63] Continuation of Ser. No. 625,892, Oct. 28, 1975.

[30] Foreign Application Priority Data

Oct. 31, 1974 Germany .............................. 2451724

[51] Int. Cl.$^2$ .............................................. H01M 6/16

[52] U.S. Cl. .................................. 429/198; 429/201; 429/204; 429/221; 429/222; 429/224; 429/225; 429/228; 429/229

[58] Field of Search ............... 429/201, 204, 198, 221, 429/222, 224, 225, 228, 229

[56] References Cited

U.S. PATENT DOCUMENTS

| | | | |
|---|---|---|---|
| 2,403,571 | 7/1946 | Wilke | 429/201 |
| 2,952,572 | 9/1960 | Johnson | 429/203 |
| 3,481,785 | 12/1969 | Ikari | 429/198 |
| 3,928,066 | 12/1975 | Lewenstein | 429/198 |

*Primary Examiner*—Charles F. LeFevour
*Attorney, Agent, or Firm*—Keil, Thompson & Shurtleff

[57] ABSTRACT

Accumulators having solution electrodes containing manganese dioxide and lead dioxide as active material on the cathode side and containing acid electrolytes. The electrolyte has a content of onium salts soluble in aqueous medium.

7 Claims, 2 Drawing Figures

ACCUMULATOR EQUIPPED WITH CATHODES OF MANGANESE DIOXIDE OR LEAD DIOXIDE

This is a continuation of application Ser. No. 625,892 filed Oct. 28, 1975.

This invention relates to accumulators having acid electrolytes and electrodes of the first kind (solution electrodes) containing manganese dioxide and lead dioxide as active material on the cathode side (i.e. the positive side of the accumulator).

For many years electrochemical research work has been aimed at finding accumulators (galvanic secondary cells) which are particularly suitable for powering electric vehicles. It is required of such accumulators that they can be subjected to frequent charge-discharge cycles without difficulty and that they possess a favorable energy-weight ratio. Furthermore, the materials used in this cell must be cheap in order to make widespread use of such accumulators possible.

The so-called lead sulfate accumulator has been in use for a very long time, but it suffers from the drawback that, due to poor utilization of the active materials, it is only possible to achieve an output of about 30 Whr/kg (theory = 167 Whr/kg).

It is also known to use, in place of sulfuric acid electrolytes, electrolyte acids with which the active materials are capable of forming water soluble salts when the battery discharges. U.S. Pat. No. 1,425,163 describes a lead accumulator in which the electrolyte consists of perchloric acid, in which divalent lead ions are present in the dissolved state when the battery has been discharged. In addition to the above lead accumulator having first-kind electrodes, other systems having first-kind electrodes are known. For example, U.K. Pat. No. 449,893 described an accumulator having $MnO_2/Zn$ electrodes and an acid electrolyte, the acids used being such as have anions which are chemically and electrochemically indifferent in the systems used and which form, with the cation of the active materials, salts which are soluble in the electrolyte. Examples of such acids are sulfuric acid, perchloric acid, tetrafluoroboric acid and hexafluorosilicic acid. In the case of the use of perchloric acid, the following reactions take place during charging and discharging:

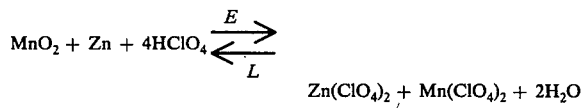

The advantage of an accumulator having solution electrodes over the lead sulfate accumulator consists in the improved energy/weight ratio due to the fact that it is possible to dispense with the heavy lead base electrodes and current leads and in the complete utilization of the active materials.

However, the known solution accumulators have the drawback that the current yield of $MnO_2$ deposition at room temperature (20° C) from an electrolyte containing Mn(II) salt is not very high and consequently the Whr and Ahr yields of such an accumulator remain relatively low. Furthermore, the cathodic reduction of $PbO_2$ proceeds incompletely.

It is an object of the present invention to improve the electrochemical behavior of the active materials of an accumulator having, on the cathode side, first-kind electrodes mounted on a base electrode and containing lead dioxide or manganese dioxide as active material and thus to improve the Whr and Ahr yields.

We have found that this object can be achieved by an electrolyte containing onium salts which are soluble in aqueous medium.

Suitable electrolytes are all acids and/or mixtures thereof which form soluble manganese or lead salts, e.g. for manganese, sulfuric acid, tetrafluoroboric acid, hexafluorosilicic acid, perchloric acid and hydrochloric acid and, for lead, perchloric acid, hexafluorosilicic acid and tetrafluoroboric acid.

Suitable active materials for the anode side are cadmium, iron (in diaphragm cells), zinc and manganese and also lead, in which latter case sulfuric acid and hydrochloric acid cannot be used as electrolyte acids.

Particularly suitable onium salts are ammonium, sulfonium, phosphonium, and arsonium salts. The anions of the onium salts may either be the same as the acid anion used or may consist of an organic radical such as p-toluene sulfonate, provided the corresponding lead or manganese salt is soluble in the electrolyte.

Examples of suitable onium salts are the normal ammonium salts, e.g. the ammonium salts of the acids used, but particularly suitable are onium salts which are alkylated or phenylated on the cation, the alkyl groups advantageously having from 1 to 4 carbon atoms. It is advantageous to use the tertiary or quaternary onium salts. Preferred onium salts in all cases are the ammonium salts.

It is a great advantage that even very small additions of onium salt to the electrolytes are fully effective. In general, additions of from 0.001 to 0.5 moles/liter of electrolyte, and preferably from 0.01 to 0.1 mole/liter of electrolyte are suitable. The optimum amount to be added depends on the onium salts used and must be determined in each case.

Suitable base electrodes for the deposition of the $MnO_2$ or $PbO_2$ from electrolytes containing additives are all materials which are virtually inert to the system used, particular examples being graphite and protected titanium, e.g. titanium coated with carbides or nitrides. The base electrodes may have any desired shape and are conveniently coarsely porous having a pore volume of from 20 to 70% and an average pore diameter of 0.1 to 2 mm.

The pH of the electrolyte is conveniently less than 5 irrespective of the state of charge of the accumulator.

Figure 1:
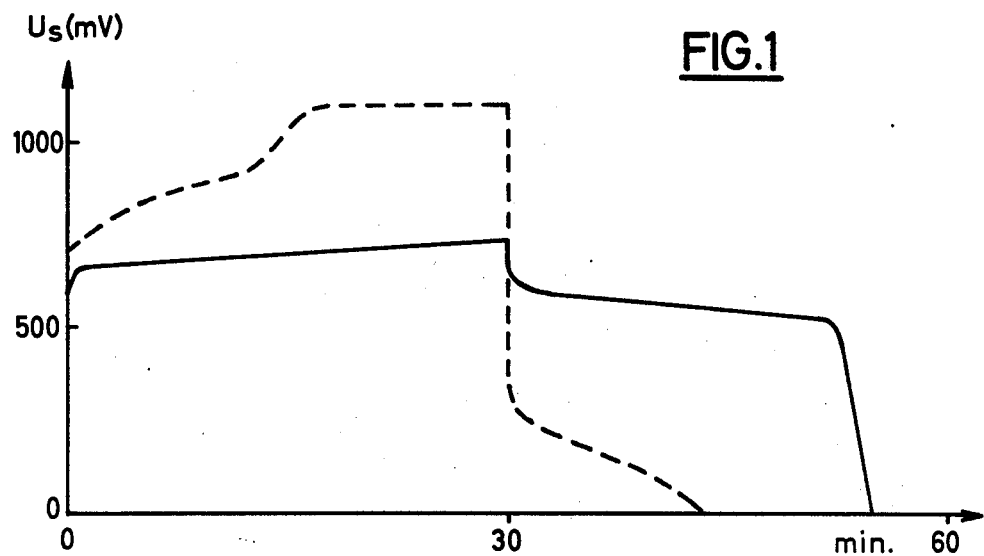
FIG. 1 is a graph illustrating the charging and discharging potentials for an anode in the presence of the additives of the present invention.

Table 1 below lists the Ahr yields which can be attained at various current densities for an electrolyte which contains 1 mole per liter of manganese and zinc salts (in the discharged state) and no additives. The figures given are average values taken from 10 cycles, the time of each cycle being about 1 hour.

In the above and the following Tables, Me denotes a methyl group and Et denotes an ethyl group, PTS is p-toluenesulfonic acid and Ph is a phenyl group.

TABLE 3

Percentages Ahr yields during charge-discharge cycling of a first-kind $MnO_2$ electrode in $HClO_4$, HCl, $H_2SO_4$ and $H_2SiF_6$ (electrolyte composition in the discharged state: 1 mole/l of manganese salt and 1 mole/l of Zn salt) at various current densities (CD) and with the addition of various onium salts. pH = 0 in completely discharged state and T = 25° C. Base electrode on cathode side: coarsely porous graphite having a pore diameter of 0.2 to 0.5 mm and a pore volume having 30%. No flow of electrolyte through electrodes.

| Electrolyte acid | Additive | CD = 2mA/cm² | CD = 5mA/cm² | CD = 10mA/cm² |
|---|---|---|---|---|
| HCl | 0.4 g/l (10⁻³ mole/l) of Ph₄AsCl | 97% | 93% | 74% |
|  | 0.4 g/l (10⁻³ mole/l) of Ph₄PCl | 95% | 90% | 80% |
|  | 10.0 g/l (0.1 mole/l) of NMe₄Cl | 90% | 90% | 82% |
| H₂SO₄ | 9.7 g/l (0.05 mole/l) of NMe₄MeSO₄ | 91% | 73% | 40% |
|  | 4.8 g/l (0.02 mole/l) of NMe₃HPTS | 90% | 68% | 30% |
| H₂SiF₆ | 4.8 g/l (0.02 mole/l) of NMe₃HPTS | 82% | 69% | 26% |
|  | 17.8 g/l (0.1 mole/l) of (NH₄)₂SiF₆ | 71% | 65% | 30% |
| HClO₄ | 4.8 g/l (0.02 mole/l) of NMe₃HPTS | 77% | 55% | 55% |
|  | 11.7 g/l (0.1 mole/l) of NH₄ClO₄ | 75% | 68% | 40% |

TABLE 1

Percentage Ahr yields during charge-discharge cycling of a first-kind $MnO_2$ electrode in various electrolyte acids and at various current densities (CD). Base material: coarsely porous graphite, pore diameter 0.2 to 0.5 mm, pore volume 30%. No flow of electrolyte through the electrode. pH = 0 (at complete discharge), T = 25° C.

| Electrolyte acid | CD = 2mA/cm² | CD = 5mA/cm² | CD = 10mA/cm² |
|---|---|---|---|
| HBF₄ | 60% | 56% | 5% |
| H₂SiF₆ | 50% | 60% | 1% |
| HClO₄ | 39% | 46% | 29% |
| H₂SO₄ | 39% | 26% | 10% |
| HCl | 68% | 84% | 62% |

Table 2 lists the Ahr yields which can be attained with various additives of onium salts in $HBF_4$. The test conditions are the same as for pure electrolyte acids.

TABLE 2

Percentage Ahr yields during charge-discharge cycling of a first-kind $MnO_2$ electrode in $HBF_4$ (electrolyte composition in the discharged state: 1 mole per liter of $Mn(BF_4)_2$ and 1 mole per liter of $Zn(BF_4)_2$) at various current densities (CD) and with the addition of various onium salts. pH = 0 (in completely discharged state), T = 25° C. Base material on the positive side: coarsely porous graphite having a pore diameter of from 0.2 to 0.5 mm and a pore volume of 30%. No flow of electrolyte through electrode.

| Additive | CD = 2mA/cm² | CD = 5mA/cm² | CD = 10mA/cm² |
|---|---|---|---|
| 10.5 g/l (0.1 mole/l) of NH₄BF₄ | 76% | 58% | 20% |
| 2.4 g/l (0.01 mole/l) of NMe₄-F-sulfonate | 68% | 71% | 62% |
| 7.5 g/l (0.03 mole/l) of NEt₄ClO₄ paratoluene-sulfonic acid | 75% | 77% | 50% |
| 4.8 g/l (0.02 mole/l) of NMe₃HPTS | 62% | 77% | 63% |
| 15.3 g/l (0.05 mole/l) of NEt₄PTS | 66% | 78% | 52% |
| 137.5 g/l (0.5 mole/l) of NEt₄EtSO₄ | 63% | 60% | 43% |
| 9.7 g/l (0.05 mole/l) of NMe₄MeSO₄ | 60% | 67% | 65% |
| 16.1 g/l (0.1 mole/l) of NMe₄BF₄ | 64% | 67% | 40% |
| 14.7 g/l (0.1 mole/l) of NMe₃HBF₄ | 66% | 67% | 40% |
| 16.4 g/l (0.1 mole/l) of SMe₃BF₄ | 66% | 69% | 39% |
| 1.8 g/l (0.01 mole/l) of SMe₃MeSO₄ | 60% | 69% | 55% |

The results listed in Table 3 above are based on the same test conditions as those indicated for Table 1. The current density was the same during charging and discharging in all tests.

It may be seen from the above results that the Ahr yield of the $MnO_2$ electrode may be considerably increased by the addition of ammonium, sulfonium, phosphonium and arsonium salts, particularly at the higher current densities. For example, the Ahr yield in $HBF_4$ may be improved by a number of additives at CD = 10mA/cm² by a factor of more than 10. The increases obtained are particularly marked in $H_2SO_4$ and $HClO_4$ and are appreciable in HCl and $H_2SiF_6$.

In addition to the improvement in Ahr yield obtained, the additives of the invention also have an advantageous effect on the charging and discharging characteristics of the $MnO_2$ electrode. The difference between charging and discharging potentials is low even at the higher current densities. Whereas the charging and discharging potentials are subject to very strong fluctuations in acid electrolytes not containing onium salts, these potentials are almost constant in the presence of the aforementioned additives (see FIG. 1). FIG. 1 is a graph of the charging and discharging potential for an anode as described in Example 1 below and measured against the reference electrode $Hg/Hg_2SO_4/1$ M $H_2SO_4$. The broken curve represents the potential without additives, whilst the solid curve is the potential with additive ($NMe_4MeSO_4$). This graph shows that the charging and discharging potentials for an anode having the additives of the invention are considerably more constant. It is particularly desirable for a battery to show a constant charging and discharging potential if it is to be used in industry on a wide scale.

The influence of onium salts on a first-kind $PbO_2$ electrode, e.g. in $HClO_4$, $HBF_4$ or $H_2SiF_6$, also improves the steadiness of the charging and discharging potentials. If the electrolyte contains no additives of the invention, there is a marked increase in the charging potential during charging as in the case of the $MnO_2$ electrode and at the commencement of discharge a minimum potential may be observed, particularly in the case of the higher current densities. These fluctuations in potential, which are detrimental to the general use of a $PbO_2$ solution electrode, may be obviated by small amounts of onium salts in the electrolyte (see FIG. 2).

Figure 2:
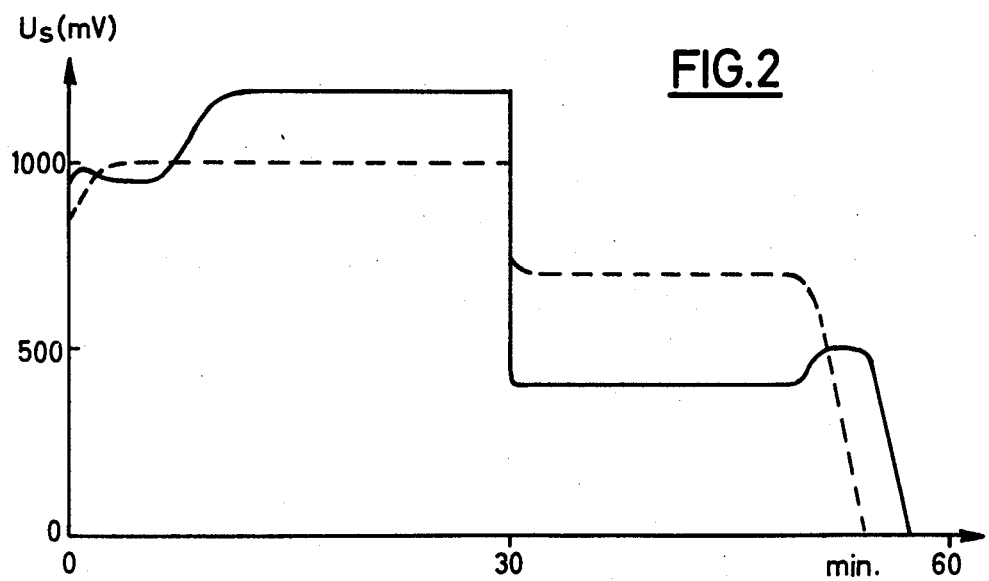
FIG. 2 is a graph illustrating the charging and discharging potentials for a cathode in the presence of the additives of the present invention.

FIG. 2 is a graph of the charging and discharging potential of a $PbO_2$ cathode, as measured against $Hg/Hg_2SO_4/1$ M $H_2SO_4$ as reference electrode, the electrolyte consisting of 2 M Pb $(BF_4)_2$ solution (pH = 0 in completely discharged state, T = 25° C). The broken curve represents the potential of the accumulator in the presence of 0.1 g/l of trimethyl ammonium p-toluene sulfonate, whereas the solid curve represents the potential obtained without said additive. Here again, the charging and discharging potentials are approximately equal when the additive is present.

TABLE 4

Percentage Ahr yield during charge-discharge cycling of a first-kind $PbO_2$ electrode in $HBF_4$ plus 2 M $Pb(BF_4)_2$ at various current densities (CD) and with the addition of various onium salts. pH = 0, T = 25° C. Base electrode: smooth graphite.

| Additive | CD = 5mA/cm² | CD = 10mA/cm² | CD = 15mA/cm² |
|---|---|---|---|
| — | 41% | 88% | 82% |
| 0.2 g/l ($10^{-3}$ mole/l) of $SMe_3BF_4$ | 47% | 81% | 81% |
| 0.1 g/l ($4.10^{-3}$ mole/l) of $NMe_3HPTS$ | 42% | 79% | 80% |

As may be seen from Table 4 above, a slight loss of Ahr yield occurs at a $PbO_2$ electrode in the presence of additives in some cases. However, the improvement in the potential profile of the electrode during charging and discharging gives a far better Whr yield with the addition of onium salts.

EXAMPLE 1

In an electrolyte vessel having a capacity of 200 cm³, a coarsely porous cylindrical graphite electrode (pore diameters 0.2 to 0.5 mm, pore volume 30%) having an area of 5 cm² functions as an cathode, whilst two platinum sheet electrodes of suitable size function as anodes at a distance of 0.5 cm from said graphite electrode. The electrolyte tested consist, in the discharged state, of a molar solution of manganese(II) salt and a molar solution of Zn salt. The electrolyte acid in this case is $H_2SO_4$. The electrolyte contains 9.75 g/l (corresponding to 0.05 mole/l) of tetramethylammonium sulfate ($NMe_4MeSO_4$). The amount of electrolyte used is 100 cm³, the pH is 0 and the temperature is 25° C. The charging and discharging current is 25 mA. The potential of the working electrode is measured against the reference electrode $Hg/Hg_2SO_4/1$ M $H_2SO_4(U_S)$ and the electrolyte is stirred by means of a magnetic stirrer. The charging time is 0.5 hr. The Ahr yield is found to be 73%. The average charging potential ($U_S$) is +680 mV and the average discharging potential ($U_S$) is +590 mV. The Whr yield over 10 cycles is 55%.

EXAMPLE 2

The test is carried out as described in Example 1 except that the positive electrode is a smooth graphite electrode. The electrolyte used is (in the discharged state) a 2 M solution of $Pb(BF_4)_2$ (pH = 0). 0.1 g/l of trimethylammonium p-toluene sulfonate ($NMe_3HPTS$) is added to the electrolyte. The amount of electrolyte used is 100 cm³ and the temperature is 25° C. Charging and discharging current is 75 mA and the charging time is about 0.5 hr.

The AHr yield is found to be 79%. The average charging potential ($U_S$) is +990 mV and the average discharging ($U_S$) is +690 mV. The Whr yield over 10 cycles is found to be 51%. The Whr yield over a series of similar tests omitting the onium salt is 24%.

EXAMPLE 3

In the same test arrangement as described in Example 1, the electrolyte used in an amount of 100 cm³ contains 0.5 M $Mn(BF_4)_2$, 0.5 M $MnSO_4$, 0.5 M Zn $(BF_4)_2$ and 0.5 M $ZnSO_4$ and, as additive, 0.01 M $(CH_3)_3S[CH_3SO_4]$. The charging time is about 1 hour and the test is carried out over 25 cycles. The pH is 1 and the temperature is 25° C. The charging and discharging current is 20 mA and the Ahr yield is found to be 72%. The average charging potential ($U_S$) is + 680 mV and the average discharging potential ($U_S$) is + 540 mV.

EXAMPLE 4

Using the same test arrangement as described in Example 1, 100 cm³ of an electrolyte containing 1 M Mn $(ClO_4)_2$ and 1 M $Pb(ClO_4)_2$ at pH = 1 is used. The additive consists of 0.1 mole/l of $NH_4ClO_4$. The charging and discharging current is 20 mA and the temperature is 25° C. The charging time is about 1 hour and the test is carried out over 15 cycles.

The Ahr yield is found to be 66%. The average charging potential ($U_S$) is + 710 mV and the average discharging potential ($U_S$) is +610 mV.

We claim:

1. An accumulator which can be alternately charged and discharged comprising:
   a. a cathode, said cathode being a first-kind electrode mounted on a base material, said electrode having either lead dioxide or manganese dioxide as its active material and wherein said first kind electrode, all the active material passes into solution on discharge;
   b. an anode selected from the group consisting of cadmium, iron (in diaphragm cells), zinc, manganese and lead; and
   c. an aqueous electrolyte, said electrolyte comprising an acid selected from the group consisting of sulfuric acid, tetrafluoroboric acid, hexafluorosilicic acid, perchloric acid, hydrochloric acid and mixtures thereof which form either soluble manganese or soluble lead salts with the proviso that when said active material in the cathode is lead dioxide or said anode is lead, sulfuric acid and hydrochloric acid cannot be used as electrolyte acids, said electrolyte further comprising an effective amount of onium salts to improve the electrochemical behavior of the, active materials of the accumulator, said onium salts being selected from the group consisting of ammonium, sulfonium, phosphonium and arsonium salts.

2. An accumulator as set forth in claim 1, wherein the onium salts are alkylated or phenylated at the cation, the alkyl groups containing from 1 to 4 carbon atoms.

3. An accumulator as set forth in claim 1, wherein the onium salts are present in the electrolyte in a concentration of from 0.001 to 0.5 mole/l.

4. An accumulator as set forth in claim 1, wherein the base material for the cathode is graphite or titanium coated with carbides or nitrides and has a coarsely porous structure with an average pore diameter of from 0.1 to 2 mm and a pore volume of from 20 to 70%.

5. An onium salt as set forth in claim 1, wherein the onium salts are alkylated with alkyl groups containing 1 to 4 carbon atoms or phenylated on the cation.

6. An accumulator as set forth in claim 1, wherein the onium salts is an ammonium salt.

7. An accumulator as set forth in claim 1, wherein the onium salts are present in the electrolyte in a concentration of from 0.01 to 0.1 mole/l.

* * * * *